INVENTOR.
HILBERT L. STEVENS

United States Patent Office 3,111,450
Patented Nov. 19, 1963

3,111,450
POLYVINYL FLUORIDE FILM CAPABLE OF BEING ADHESIVELY SECURED AND METHOD
Hilbert L. Stevens, Manheim, Pa., assignor to Armstrong Cork Company, Lancaster, Pa., a corporation of Pennsylvania
Filed Feb. 1, 1961, Ser. No. 86,333
12 Claims. (Cl. 161—189)

This invention relates generally to polyvinyl fluoride films, and more particularly to coated polyvinyl fluoride films. Still more particularly the invention relates to a polyvinyl fluoride film which has been treated so as to enable the film to adhere to a layer of a normal rubber-based adhesive.

Films and sheets of polyvinyl fluoride are being used in more and more applications. Such films and sheets possess excellent strength and inertness to a wide variety of solvents. The sheets are readily available in thicknesses measuring from about 0.5 mil up to 4 mils, and thicker. The sheets and films are available in a variety of colors as well as clear and hence are suitable for a variety of surface coating applications. However, the films and sheets must generally be adhered to a substrate of some kind. This substrate may be a particle board, felt, cloth, or a resin.

It has been found, however, that polyvinyl fluoride sheets and films do not lend themselves to the formation of a strong laminate by means of a rubber-based adhesive. Polyvinyl fluoride films are not susceptible to the formation of strong, tough bonds to a suitable substrate by means of rubber-based adhesives. The polyvinyl fluoride film may generally be readily peeled off the substrate wherever the rubber-based adhesives are used. It has not been possible to improve the situation by means of the usual solvents. As mentioned earlier, polyvinyl fluoride is an inert material, exceptionally impervious to chemical action and sufficiently smooth and dense to inhibit the formation of a usable bond with the common rubber-based adhesives.

It is the primary object of the present invention to supply a polyvinyl fluoride film which has been treated to allow good bond formation with a rubber-based adhesive. It is a further object of the present invention to present a process for treating polyvinyl fluoride films and sheets in order to render those films and sheets susceptible to bond formation with rubber-based adhesives.

These objects are achieved in a strikingly effective manner. The invention contemplates a sheet of polyvinyl fluoride having one surface thereof coated with a cross-linked polyurethane. The polyurethane is the reaction product of a polyoxyalkylene glycol and an organic diisocyanate. The polyurethane has been cured with a cross-linking agent. The polyurethane used in the present invention is made from polyalkylene ether glycols, many of which can be formed by the condensation of suitable alkylene oxides. For example, ethylene oxide may be treated in known manner to form polyethylene glycols of various molecular weights. Propylene oxide and butylene oxide may be used in the same manner. The alkylene group in the polyalkylene ether glycols will contain generally 2–5 carbon atoms and will be linked to adjacent alkylene groups by means of an ether oxygen. It is not necessary that the alkylene groups in the glycols be identical for any given polyoxyalkylene glycol. Thus the condensation product of a mixture of, for example, ethylene oxide and propylene oxide may be used.

Figure 1:
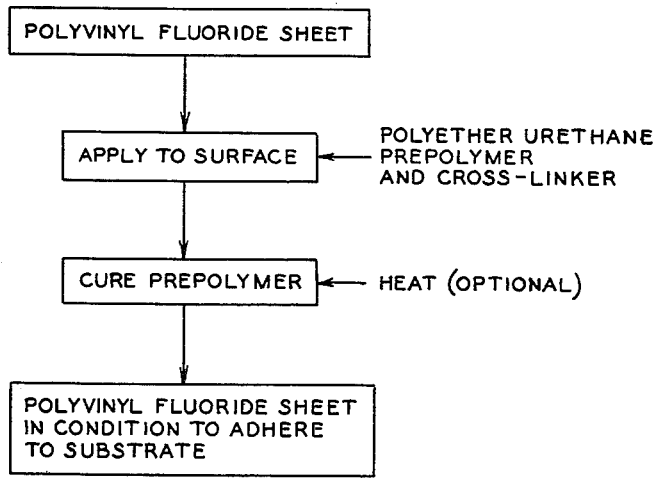
FIG. 1 is a simplified flow diagram of the present method.
Figure 2:
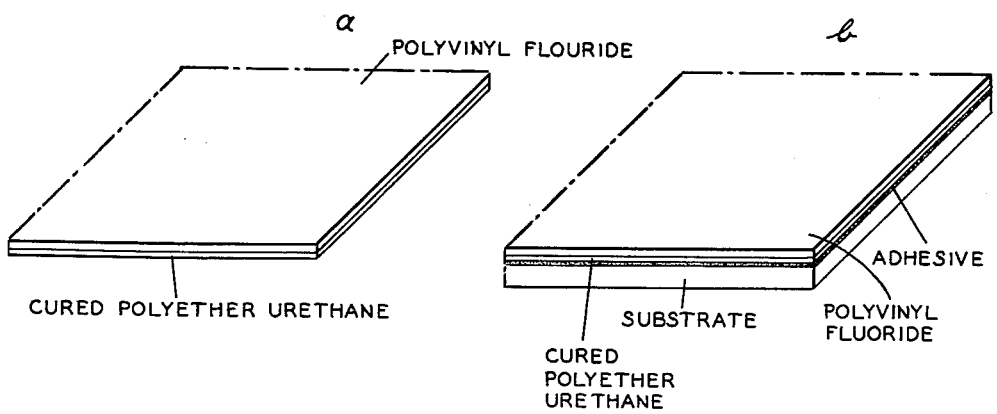
FIG. 2a is a simplified representation of the modified sheet of the present invention.
FIG. 2b is a simplified representation of a laminate according to the present invention.

The molecular weight of the polyoxyalkylene glycols should be in the range of about 400–4000 since it is this range which allows the production of the diisocyanate-modified polyalkylene ether glycols suitable for the purpose intended. Most usually, the molecular weight of the starting polyalkylene ether glycol will be in the range of about 1000–2000.

The polyalkylene ether glycols which have two terminal hydroxyl groups are reacted with aliphatic or aromatic diisocyanates. There may be used hexamethylene diisocyanate, the naphthalene diisocyanates, the toluene diisocyanates, 4,4'-diphenyl diisocyanate, 4,4'-diphenylene methane diisocyanate, dianisidene diisocyanate, 4,4'-tolidene diisocyanate, and m-phenylene diisocyanate. The diisocyanate of choice is 2,4-toluene diisocyanate. Since the polyoxyalkylene glycol contains two hydroxyl groups, it is desired that one diisocyanate molecule react with each hydroxyl group. Accordingly, approximately two mols of the organic diisocyanate which has no other reactive groups on the molecule will be used per mol of the polyoxyalkylene glycol.

The reaction is preferably carried out at elevated temperature by melting the polyoxyalkylene glycol, if necessary, and stirring in the diisocyanate while maintaining the melt at an elevated temperature in the range of about 80°–200° C. The actual temperature at which the reaction is carried out will be determined by the usual considerations of volatility of ingredients, speed of reaction desired, degradation of starting ingredients or products, and convenience. The reaction at elevated temperatures is usually exothermic, and to insure completion of the reaction, it is preferred to maintain the melt at an elevated temperature for an hour or so after subsidence of the exotherm in order to insure complete reaction.

The resulting polyurethane, the prepolymer, is the reaction product of the polyoxyalkylene glycol and the organic diisocyanate. The molecules are linear, and little or no chain extension has taken place during the reaction. The molecules are terminated at each end with an isocyanato group. These isocyanato groups are the curing sites for the polyurethane polymer.

Curing of the polymer may be accomplished in known manner once the polymer has been placed on a surface of a polyvinyl fluoride film or sheet. The melt may be doctored directly onto the polyvinyl fluoride surface, or it may be cooled and taken up in solution as in a ketone or hydrocarbon solvent. The solution may then be wiped, sprayed, rolled, or otherwise conveniently coated on the surface of the polyvinyl fluoride film. One advantage of using the solution method to apply the polyurethane film to the polyvinyl fluoride sheet is that a suitably thin film of the polyurethane may be deposited with little effort.

The cross-linking agent is preferably admixed with the polyurethane and deposited on the polyvinyl fluoride surface as a mixture. Thus the cross-linking agent may be stirred into the melt or dissolved in the solvent and applied to the polyvinyl fluoride surface in intimate mixture with the polyurethane. Alternatively, however, the cross-linking agent may be applied after the prepolymer polyurethane has been applied to the surface of the polyvinyl fluoride film. Such application may be carried out by spraying or by dissolving the cross-linking agent in a solution and spraying, wiping, doctoring, rolling, or otherwise applying the cross-linking agent in solution to the polyvinyl fluoride film carrying the coating of polyurethane prepolymer.

The cross-linking agents to be used are those cross-linking agents known to cure polyurethane prepolymers. Generally they are organic compounds which contain at least two active, replaceable, hydrogen atoms on the molecule. Various glycols are suitable such as ethylene glycol, 1,2-propylene glycol, 1,3-propylene glycol, 1,3-butylene glycol, 1,4-butylene glycol, 1,6-hexanediol, methyl hexane-1,6-diol, 1,4-butenediol, diethylene glycol, thiodiglycol, 2,2'-dimethyl-1,3-propylene glycol, and the like. Primary amines may be used such as the ethyl, propyl, butyl and hexylamines. Diamines are also suitable, such as ethylene diamine, propylene diamine, butylene diamine, and the like. Amino alcohols, such as amino-ethyl-alcohol, 2,2-dimethyl propanol-amine, 1,3-diethanolamine, 3-amino-cyclo-hexanol, p-aminophenyl-ethyl-alcohol, 3,3' - dichloro - benzene, p,p'-diamino-di-phenyl-methane, and 3,3'-dichloro, 4,4'-diamino-diphenyl methane, may be used.

The cross-linking agent will be added in an amount sufficient to react with all the isocyanato groups which terminate the end of each polyurethane prepolymer chain. One mol of cross-linker is needed for each mol of polyurethane prepolymer to complete the reaction. Excess amounts of cross-linking agent are not significant but will remain in the film unless removed by drying or wiping or the like. The cross-linking agent will cure the polyurethane prepolymer film into the final cured polyurethane at room temperature in a few hours' time. Elevated temperatures may be used if desired, both to remove any solvent from the polyurethane prepolymer film and to hasten the curing of the film. However, even the uncured film will not cause blocking of the polyvinyl fluoride should the polyvinyl fluoride be rolled up for convenience in transportation. The dried film, even prior to curing, may be used to bring about adherence of the polyvinyl fluoride film to a conventional rubber-based adhesive. Curing will occur after the lapse of a few hours.

The polyurethane-treated surface of the polyvinyl fluoride sheets and films is now susceptible of adherence to any of the conventional rubber-based adhesives. These adhesives utilize butadiene-styrene copolymers, polychloroprene, butadiene-acrylonitrile copolymers, butyl rubbers, reclaim rubbers, and natural rubbers as bases for adhesives. Usually the rubber is dissolved in a solvent system. The adhesive will also generally contain a natural or synthetic resin to fortify, extend, or tackify the total adhesive system. Fillers, pigments, antioxidants, and other additives, including curing systems for the rubbers, may also be present in the adhesive.

Adhering the treated polyvinyl fluoride film of the present invention to an adhesive-coated substrate is readily carried out. The adhesive is applied to the substrate such as a felt, paper, cloth, wood, plastic, metal, ceramic, cement, plaster, or in fact any desired substrate, by wiping, painting, spraying, brushing, rolling, or other convenient means of application of the adhesive. Preferably the solvent will be removed or allowed to volatilize from the adhesive. The treated polyvinyl fluoride sheet of the present invention is then laid on the adhesive layer. Smoothness and increased adherence may be obtained by rolling or pressing the polyvinyl fluoride film into the adhesive layer. Excellent bonds are made by drying the adhesive film and laminating it with the treated polyvinyl fluoride film under pressure at elevated temperatures of about 300°–350° F. Depending on the characteristics of the adhesive used, the resulting laminate may be aged at room or elevated temperatures for any desired period of time.

The films and sheets of the polyvinyl fluoride may be preliminarily treated to improve the over-all adhesion. For example, one surface of the polyvinyl fluoride film or sheet may be subjected to a strong acid or alkaline wash. Alternatively, it may be treated with chlorine vapor or strong alkaline hydrogen peroxide or ozone. Alternate methods of degrading slightly the surface of the polyvinyl chloride film are available. When the surface of the polyvinyl chloride sheet is pretreated, increased peel strength is frequently noted in the final laminate after coating the pretreated surface with the polyurethane in accordance with the present invention.

The following examples illustrate several embodiments of the invention. All parts are by weight unless otherwise stated.

*Example 1*

A polybutylene glycol was reacted with sufficient toluene-2,4-diisocyanate to react with the terminal hydroxyl groups leaving dangling isocyanato groups at the end of the chain. The resulting polyurethane prepolymer was a viscous liquid.

With stirring, 10 parts of the polyurethane prepolymer were dissolved in 300 parts methyl ethyl ketone, and there was then added 1.1 parts 3,3'-dichloro-4,4'-diamino diphenyl methane.

The solution was wiped onto one surface of a sheet of polyvinyl fluoride measuring 2 mils in thickness. The film was allowed to dry at room temperature. As soon as the film was dry, the sheet of polyvinyl fluoride could be folded on itself without blocking. Several specimens were dried at 180° F. for two hours.

A film of a conventional adhesive was laid down on a wood backing. The adhesive was made of a blend of butadiene-acrylonitrile copolymer, and a thermosetting phenol-formaldehyde fortifying resin, in a solvent base. The adhesive film was about .005" thick. After the solvent evaporated, the polyvinyl fluoride sheet having the surface treated with the cured polyurethane was rolled onto the adhesive, and the bond heated with pressure to 300°–350° F. After aging overnight, the peel strength of the bond as measured by peeling off the treated polyvinyl fluoride film, was 22 pounds per inch of width. A duplicate run was made save that the polyvinyl fluoride film was not treated with the polyurethane, gave a peel strength of 10 pounds per inch of width.

Improved results are noted wherein the adhesives used with the treated polyvinyl fluoride film are polychloroprene adhesives and butadiene-styrene copolymer adhesives.

*Example 2*

A series of polyurethane prepolymers is prepared by reacting a polyoxyalkylene ether with an organic diisocyanate. Mixtures of the prepolymer with cross-linking agents are prepared and wiped on one surface of the polyvinyl fluoride sheet. After cure, improved adhesion results with a rubber-based adhesive. The following table lists the ingredients for preparation of the cured polyurethane film on one surface of the polyvinyl fluoride sheet.

| Polyoxyalkylene Glycol | Organic Diisocyanate | Cross-Linking Agent |
| --- | --- | --- |
| Ethylene oxide (9.5 mols) plus trimethylol propane (1 mol). | Hexamethylene diisocyanate. | 1,4-butanediol. |
| Polyethylene glycol | 4,4'-diphenylmethane diisocyanate. | Ethylene glycol. |
| Polybutylene glycol | 1,4-phenylene diisocyanate. | Ethanolamine. |

I claim:
1. A sheet of polyvinyl fluoride having one surface thereof coated with a polyurethane which is the reaction product of a polyoxyalkylene glycol having a molecular weight in the range of 400–4,000 and an organic diisocyanate, said polyurethane being cured by means of a cross-linking agent reactable with isocyanato groups.

2. A sheet according to claim 1 wherein said polyoxyalkylene glycol comprises a polyethylene glycol.

3. A sheet according to claim 1 wherein said polyoxyalkylene glycol comprises a polyoxybutylene glycol.

4. A sheet according to claim 1 wherein said organic diisocyanate comprises a toluene diisocyanate.

5. A sheet according to claim 1 wherein said cross-linking agent comprises a glycol.

6. A sheet according to claim 1 wherein said cross-linking agent comprises a diamine.

7. A laminate comprising a substrate and a sheet of polyvinyl fluoride bonded thereto by means of a rubber-based adhesive, said sheet having the surface thereof which contacts said adhesive coated with a polyurethane which is the reaction product of polyoxyalkylene glycol having a molecular weight in the range of 400–4,000 and an organic diisocyanate, said polyurethane being cured by means of a cross-linking agent reactable with isocyanato groups.

8. The method of treating a sheet of polyvinyl fluoride to place a surface in condition for adherence to a layer of rubber-based adhesive which comprises applying to said surface a polyurethane prepolymer terminated with isocyanato groups, said prepolymer being the reaction product of a polyoxyalkylene glycol having a molecular weight in the range of 400–4,000 and an organic diisocyanate, and curing said polyurethane by means of a cross-linking agent reactable with isocyanato groups.

9. A method according to claim 8 wherein said polyoxyalkylene glycol comprises ethylene glycol.

10. A method according to claim 8 wherein said polyoxyalkylene glycol comprises a polyoxybutylene glycol.

11. A method according to claim 8 wherein said polyurethane prepolymer comprises the reaction product of polyoxybutylene glycol and toluene 2,4-diisocyanate.

12. The method according to claim 8 wherein said cross-linking agent comprises a diamine.

References Cited in the file of this patent

UNITED STATES PATENTS

| | | |
|---|---|---|
| 2,430,479 | Pratt et al. | Nov. 11, 1947 |
| 2,774,704 | Smith | Dec. 18, 1956 |
| 2,806,812 | Merz | Sept. 17, 1957 |
| 2,826,526 | Meyrick et al. | Mar. 11, 1958 |
| 2,839,443 | Fleming | June 17, 1958 |
| 2,905,582 | Coleman et al. | Sept. 22, 1959 |
| 3,046,172 | Reid | July 24, 1962 |

FOREIGN PATENTS

| | | |
|---|---|---|
| 810,095 | Great Britain | Mar. 11, 1959 |
| 1,134,599 | France | Dec. 3, 1956 |